United States Patent [19]

Nimberger

[11] Patent Number: 4,582,089
[45] Date of Patent: Apr. 15, 1986

[54] VALVE MANIFOLD HAVING A REMOVABLE FLANGE

[75] Inventor: Spencer M. Nimberger, Houston, Tex.

[73] Assignee: General Screw Products Company, Houston, Tex.

[21] Appl. No.: 666,668

[22] Filed: Oct. 31, 1984

[51] Int. Cl.⁴ ............................................. F16L 23/00
[52] U.S. Cl. ..................................... 137/884; 137/269; 251/148; 285/12; 285/414; 403/335
[58] Field of Search ...................... 137/269, 271, 884; 251/148, 151; 285/12, 161, 414; 403/335, 336; 73/201, 861.42, 861.61

[56] References Cited

U.S. PATENT DOCUMENTS

| | | | |
|---|---|---|---|
| 1,993,243 | 3/1935 | Kennedy | 73/201 |
| 2,419,642 | 4/1947 | Henry | 137/269 X |
| 2,871,881 | 2/1959 | Hewson | 73/861.42 X |
| 3,317,003 | 5/1967 | Luhas | 137/269 X |
| 3,431,935 | 3/1969 | Bowditch | 137/269 |
| 3,509,904 | 5/1970 | Olson | 137/884 X |
| 3,520,315 | 7/1970 | Dobrikin | 137/269 X |
| 3,741,236 | 6/1973 | Pass et al. | 137/269 |
| 3,817,283 | 6/1974 | Hewson | 137/884 |
| 3,944,264 | 3/1976 | Mong et al. | 285/161 X |
| 3,993,091 | 11/1976 | Loveless | 137/269 |
| 4,252,346 | 2/1981 | Sundholm | 285/414 X |
| 4,494,568 | 1/1985 | Young | 251/148 X |

*Primary Examiner*—A. Michael Chambers
*Assistant Examiner*—John C. Fox
*Attorney, Agent, or Firm*—Carwell & Helmreich

[57] ABSTRACT

A valve manifold is provided of the type commonly referred to as an instrument manifold and used in systems designed to detect pressure differential. The manifold includes first and second passageways interconnecting a pair of input ports and a pair of output ports. Removable flanges are provided on the input and/or the output ends of the manifold. Each flange may be structurally secured to the valve manifold body by special nipples, and is provided with apertures for receiving bolts to mount the flanges to related process-side or instrument-side equipment. A threaded end of the nipple is adapted for sealing engagement with the manifold body, while the other end of the nipple is adapted for sealing engagement with elliptical-shaped flanges or a differential pressure transmitter. The versatility of the valve manifold is substantially increased, since the removable flanges allow the same manifold body to be used for either direct or remote mounting.

20 Claims, 4 Drawing Figures

VALVE MANIFOLD HAVING A REMOVABLE FLANGE

FIELD OF THE INVENTION

The present invention relates to valve manifolds having removable flanges and, more particularly, relates to valve manifolds of the type having a pair of input ports and a pair of output ports and commonly referred to as instrument manifolds. The valve manifold of the present invention may be interconnected between an orifice flange and a pressure transducer, and may be used to test the accuracy of response from the pressure transducer.

BACKGROUND OF THE INVENTION

Instrument manifolds are commonly utilized in differential pressure systems between the source of the differential pressure and the pressure transducer, monitor, or meter. In a typical installation, a three-valve instrument manifold is installed between an orifice flange and a transmitter, and is used to (a) normally transmit two different pressures to the transmitter, and (b) intermittently test the reliability of the transmitter. The testing of the transmitter may be accomplished by several techniques, including opening a "crossover valve" so as to subject the transmitter to the same pressure on both sides of the differential pressure transmitter.

Various embodiments of three-valve and five-valve instrument manifolds are described in Anderson Greenwood & Co. catalog 3000 titled "AGCO MANIFOLDS", dated June, 1979. As disclosed in this catalog, each instrument manifold includes two inlet ports and two outlet ports, and a "crossover valve". The instrument manifold may also include either two or four control valves depending upon the particular installation and the desired use of the manifold by the customer, so that instrument manifold are commonly referred to as mono-valve, three-valve, or five-valve manifolds.

Without regard to the number of control valves, prior art instrument manifolds are basically of two types: (1) those designed for direct coupling on the input and/or the output ends of the manifold; and (2) those designed for remote coupling. The manifold ends designed for direct coupling utilize a flange integral with the manifold body, while ports in the manifold ends designed for remote coupling are tapped for receiving threaded fittings. The manifold bodies with flanges shown in the Anderson, Greenwood catalog are extruded, so that the flange and body are initially formed as a single unit. Alternatively, flange ends have been welded or otherwise permanently fixed to the manifold body to obtain a modified manifold adapted for direct coupling. Hoke Inc. has manufactured manifold bodies having flanges, although the flanges are physically spaced from the manifold body.

The interconnection of an instrument manifold to both the orifice flange and the differential pressure sensor may thus be made by either a remote coupling or a direct (close) coupling. Referring first to a remote coupling for an orifice flange/manifold interconnection, this interconnection is typically made between the two threaded ports of the orifice flange and the two threaded input ports of the manifold by flaired-end pliable tubing and hydraulic end connectors. With this remote coupling, the manifold may be located a selected distance generally exceeding six inches from the orifice flange, and the manifold is typically structurally supported separate from the orifice flange. Similarly, a remote coupling between the manifold and the transmitter may be made with pliable tubing and end connectors, and the transmitter may also be located a selected distance from the manifold and structurally supported separate from the manifold. An advantage for remote coupling relates to the flexibility in placing the instrument manifold and the pressure sensor at any desired location relative to the orifice flange. Also, remote coupling of manifold flanges has often been preferred because of the availability of instrument manifolds at reasonable costs having tapped ½ inch NPT input and output ports.

On the other hand, there are significant and sometimes critical advantages to direct coupling over remote coupling. Using direct coupling, the spacing between the transmitter and the orifice flange may be minimized to achieve a high speed of response to a change in differential pressure. Fewer fluid-tight interconnections are required for direct coupling so that there is a reduced number of leak points and an increased pressure signal reliabiity. Each of the passageways interconnecting the orifice flange to the transmitter may be provided along a central axis, thereby simplifying rod-out operations and reducing maintenance costs. Also, installation costs may be substantially reduced when using direct coupling, in part because the instrument manifold and transmitter do not require separate support structures. The manifold and transmitter may be mounted on a single support, or both the manifold and transmitter may be sufficiently supported by their interconnections to the orifice flange affixed to the flow lines so as to require no additional support.

A major disadvantage of most prior art instrument manifolds relates to the inability to utilize the same manifold body for either direct coupling or remote coupling. Instrument manifolds designed for remote coupling at both ends are typically-manufactured with ½ inch NPT threads on 2⅛ inch (5.4 cm.) centerline spacings at the two inlet and the two outlet ports. The block-shaped body of such an instrument manifold preferably is thin and narrow to reduce material and manufacturing costs for the manifold. An instrument manifold designed for direct coupling at one end may be manufactured with a flange fixed to the body as described above, and instrument manifolds designed for direct coupling at both ends may be similarly manufactured with flanges at each end of the manifold. Instrument manifold manufacturers of no-flange (remote coupling at both ends), single-flange (remote coupling at one end and direct coupling at the other end), and double-flange (direct coupling at both ends) manifolds thus must incur signficant tooling and manufacturing costs for providing these three versions of manifolds.

Another disadvantage of most prior art instrument manifolds relates to their lack of flexibility to the customer. The customer may not uniformly use one type of manifold for various applications, and therefore the customer may have to stock sufficient quantities of no-flange, single-flange, and double-flange manifolds. Also, manifolds with fixed flanges practically cannot be altered, and a single-flange manifold removed from one application therefore is not modified in the field if the customer requires an application requiring a no-flange or a double-flange manifold.

Still another problem with prior art flange manifolds relates to the high replacement costs if a flange is damaged. If one of the seating surfaces adjacent the O-ring seal of a double-flange manifold is nicked, the value of the entire manifold may be lost and the customer may be forced to discard the manifold.

The general concept of a removable flange for a product is, of course, not novel. U.S. Pat. Nos. 1,258,166 and 2,552,750 disclose pipe joints with flanges threaded secured to the ends of the pipe. U.S. Pat. No. 3,942,141 discloses a two-piece flange with an annular projection for engaging a groove in an associated tube. An adapter pad and a split flange capable of coupling an S.A.E. pressure flange coupling to a pressure port requiring a step flange is disclosed in U.S. Pat. No. 4,225,161. U.S. Pat. No. 4,252,346 discloses an insert in a flange which may be used to alter a threaded pipe connection to a flange connection. Another version of a flange joint employing a plurality of clamping bolts is shown in U.S. Pat. No. 4,426,103.

The teachings of the above listed patents are, however, not readily adaptable to instrument manifolds. Flanges utilized with conventional instrument manifold bodies designed for remote coupling cannot be easily threaded to the ends of the manifold body. Also, the size of a standard instrument manifold body designed for remote mounting is minimized as explained earlier to reduce manufacturing and material costs. Accordingly, there is not sufficient material on the manifold body for receiving conventionally-sized bolts adjacent the exterior of the flange for bolting the flange to the manifold body.

The disadvantages of the prior art are overcome by the present invention. Improved apparatus is hereinafter provided for securing a flange to a standard instrument manifold designed for remote coupling. The valve manifold of the present invention can thus be easily altered for either remote or direct mounting at one or both ends of the manifold body.

SUMMARY OF THE INVENTION

The instrument manifold according to the present invention includes a manifold body having first and second passageways connecting two inlet ports and two exit ports each threaded for remote mounting. The manifold includes a cross-over valve and a selected number of control valves. One or both ends of the instrument manifold may be provided with a flange having a plurality of apertures for enabling the flange to be directly mounted to corresponding upstream or downstream equipment. The flange is structurally secured in rigid engagement with the instrument manifold by a pair of specially designed nipples each including a passageway for maintaining fluid communication between the valve manifold and the upstream or downstream equipment.

One end of each of the special nipples is threaded for sealing engagement with NPT threads normally provided in the manifold body for remote mounting connectors. This threaded connection is made up in a fluid-tight manner at the same time the nipple forces the flange into secured engagement with the manifold body. The other end of the nipple is provided for sealing engagement with the upstream or downstream equipment, e.g., with a transducer or elliptical-shaped flanges. The nipple may be provided with a hexagonal shaped interior surface along a portion of the passageway, so that the nipple may be threaded to the manifold body by conventional tooling. The same valve manifold body may thus be utilized for instrument manifolds adapted for either remote mounting or direct mounting.

Accordingly, it is a feature of the invention to provide an improved valve manifold having a removable flange.

It is another feature of the invention to provide an instrument manifold at a reduced manufacturing cost which is adapted for direct mounting.

It is a further feature of the invention to provide an improved instrument manifold which can be readily altered for either a remote mounting or a direct mounting.

Still another feature of the invention is an instrument manifold adaptable for direct mounting and having reduced repair and maintenance costs.

It is a further feature of the invention to provide an instrument manifold having a direct mounting flange rigidly secured to the manifold body by a pair of nipples in sealing engagement with a corresponding pair of ports in the manifold body.

These and other features and advantages of the present invention will become apparent from the following detailed description, wherein reference is made to the Figures in the accompanying drawings.

DETAILED DESCRIPTION

Figure 1:
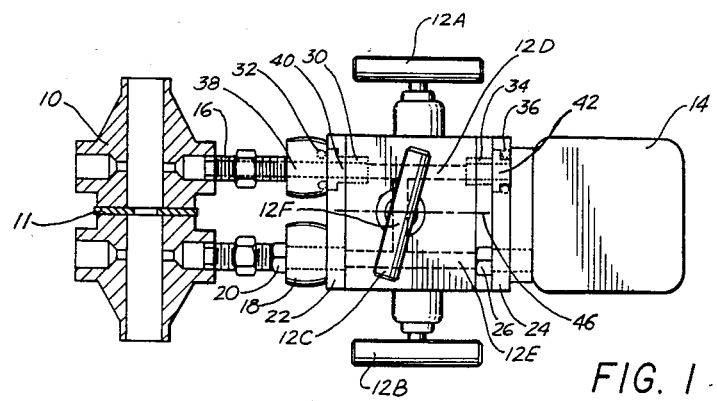
FIG. 1 is a top view, partially in cross-section, of a typical installation including an instrument manifold according to the present invention interconnected between an orifice flange and a differential pressure transducer.

Referring to FIG. 1, a typical installation of an instrument manifold according to the present invention is depicted in a close or direct mounting interconnection with both orifice flange 10 and transmitter 14. The manifold includes body member 12 having first and second line block valves 12A and 12B for controlling fluid flow through corresponding passageways 12D and 12E, and a crossover valve 12C for controlling flow through crossover passageway 12F.

In a typical installation, the transmitter 14 is used to monitor the pressure differential across an orifice plate 11 in body 10 and thereby measure the flow rate 11 through the orifice flange. In some applications, it may also be necessary to quantitatively measure the upstream or downstream static pressure in order to calculate flow rates through the orifice flange. The assembly as shown in FIG. 1 is typically used to measure the quantity of liquid or gas passing through a pipeline (not shown) interconnected to the orifice flange. The end of the manifold adjacent the orifice flange containing the pressure input ports is commonly referred to as the "process side", and the end of the manifold adjacent the transmitter 14 is commonly referred to as the "instrument side."

Pressure on both the upstream and downstream sides of the orifice plate is therefore separately passed through a nipple 16, an elliptical-shaped flange 18, a process-side nipple 30, passageway 12D or 12E in the manifold body 12, instrument-side nipple 34, and to transmitter 14. Transmitter 14 may either detect the differential in pressure values between the upstream and downstream sides of restriction 11, or the static pressure value at either of these locations and the differential in pressure values. Normally, valves 12A and 12B are therefore open and crossover valve 12C is closed. In order to check the accuracy of the reading from the transmitter, valve 12B may be closed and crossover valve 12C opened. The transmitter is thereby subjected to this same pressure (in this case, the pressure on the downstream side of the orifice plate 11), and the differential pressure reading from the transmitter should therefore be zero.

The function of the components described above (aside from special nipples 30 and 34) is well known in the art and therefore is not more fully described herein. More particularly, the concept of the present invention is applicable to a mono-valve, three-valve, or five-valve instrument manifold. Details regarding three-valve and five-valve manifolds available in either a hard valve seat or soft valve seat arrangement are more fully disclosed in published General Screw Products Company catalog No. 1283, hereby incorporated by reference.

The manifold body 12 shown in FIG. 1 is adapted for remote couping, i.e., both the input and output ports are tapped for ½ inch NPT fittings. According to the present invention, removable flanges 22 and 24 have been directly attached to each end, so that the manifold as shown is adapted for direct coupling. It should be understood that the manifold including body 12 and flanges 22 and 24 may be symmetrical about centerline 46, although different components are depicted in FIG. 1 for clarity.

A pair of short pipe nipples 16 are each threaded at one end to the orifice flange 10 and at the other end to one of a pair of commonly used elliptical-shaped flanges or "footballs" 18. The footballs 18 may then be structurally connected to flanges by bolts 20. Flange 22 is provided with upper and lower threaded apertures on centerline spacings of 1.625 inches, which is the standard spacing for bolt holes in such elliptical-shaped flanges. On the instrument side, the transmitter 14 may be directly mounted to the flange by a plurality of bolts 26. Flange 24 is similarily provided wth two upper and two lower direct mounting apertures also on standard centerline spacings of 1.625 inches. Alternatively, direct mounting could be made between the instrument manifold and a transmitter by two nipples (or two lengths of pipe) and footballs, as described above.

Flange 22 is structurally interconnected to and in engagement with manifold body 12 by a pair of specially-designed nipples 30 each having a central passageway 40. The removable flange 24 on the instrument side of the manifold is similarly structurally secured to and in engagement with the manifold body by a pair of nipples 34 each having a passageway 42. Flanges 22 and 24 may thus separately be removed from the manifold body and reinstalled on the same manifold body or another manifold body, depending upon whether a remote or direct coupling is desired.

Each nipple 30 is threaded in fluid-tight manner to the tapped ½ inch NPT sidewalls of an input port, and each nipple 34 is similarly threaded to an exit port. A seal 32 provides sealing engagement between each football and nipple 30, and a seal 36 provides sealing engagement between nipple 34 and the flanged end of a transmitter. On the process-side, fluid pressure is transmitted from the passageway 38 in football 18 to each passageway in the body 12 solely through nipple 30. On the instrument-side, the fluid pressure is transmitted from each passageway in the manifold 12 to the transmitter 14 solely through the nipple 34. No portion of flange 22 or flange 24 thus is required to be in sealed engagement with another component to prevent loss of fluid.

Figure 2:
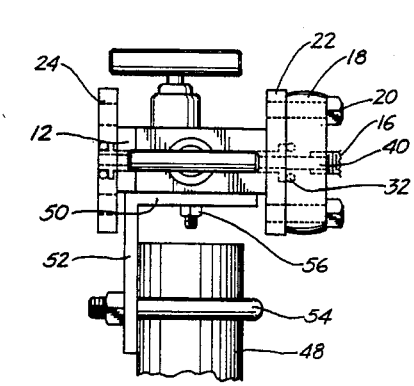
FIG. 2 is a side view of another embodiment of an instrument manifold and support member according to the present invention.

FIG. 2 depicts a side view of a suitably mounted instrument manifold according to the present invention. In FIG. 2, the process side of the manifold is the right side, and the "football" 18 is depicted between the pipe nipple 16 and the flange 22. The instrument side of the manifold is depicted with the flange 24 directly affixed to the manifold body 12, so that a suitable monitoring device may be thereafter mounted to the flange 24.

An L-shaped bracket 52 is affixed to tubular support 48 by one or more standard U-bolts 54. Manifold 12 is affixed to the top portion 50 of the bracket 52 by one or more mounting bolts 56. If desired, a spacer bar or heat block (not depicted) may be inserted between the manifold 12 and the top portion 50, which allows the bottom of both flanges 22 and 24 to clear the top of the bracket 52. Because of the direct mounting connection possible according to the present invention, a suitable transmitter (not depicted) may be mounted to the instrument side of the manifold 12, and the transmitter need not be separately mounted.

Figure 3:
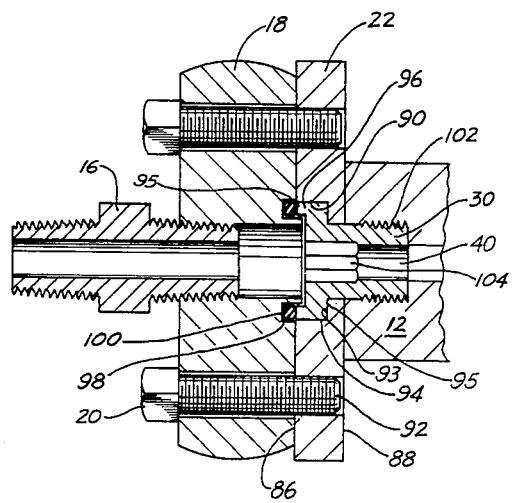
FIG. 3 is a side view, partially in cross-section, of a suitable flange and fitting for mounting on the process side of an instrument manifold.

Referring to FIG. 3, further details with respect to the structural and fluid connection to each nipple 16 and an input port of the manifold body are depicted. Assuming a direct coupling is desired on the process side of the manifold, flange 22 having first and second nipple receiving apertures may be secured to the valve body by first and second special nipples 30. Each nipple 30 has ½ inch NPT threads for engagement with corresponding threaded sidewall portions of an input port for either the first and second passageways 12D, 12E through the valve body. A circular-shaped stop portion or shoulder 95 on the nipple 30 is adapted for engagment with a similar circular-shaped lip portion surface 93 on the flange 22, forcing the flange 22 into engagement with the manifold. The spacing between the stop portion 95 and the threads 102 on the nipple and the spacing between the lip portion surface 93 and the interior surface 28 of the flange 22 are controlled so that the substantially planar surface 88 of the flange comes into secured engagement with the end of the manifold body when the threads 102 obtain sealed engagement with the input port. Final tightening on the nipple 30 using a standard Allen wrench to obtain an NPT seal and secured engagement of the flange to the manifold body may be substantially simultaneously obtained. A portion of the passageway 40 in the fitting 30 is defined by a plurality of torque engaging surfaces 104 shaped to receive an appropriately sized Allen wrench for similar tool. The fitting 30 is substantially cylindrical-shaped and its passageway 40 is aligned with the passageway through the manifold body in order to accommodate rod-out operations. The expanded end portion 96 of a fitting 30 includes cylindrical-shaped outer surface 94 for fitted engagement with a cylindrical inner surface 90 of the flange 22. Once the fitting 30 is secured to the body 12, no substantial movement of the flange with respect to the body will thereafter occur.

Conventional fitting 18 will normally be provided with a circular-shaped aperture 98 for receiving an O-ring or other suitable sealing means. The eccentric fitting for football 18 may be threaded to the pipe nipple 16 until sealed engagement is obtained. Each of the two direct mounting apertures in the football is aligned with an upper or lower direct mounting aperture in the flange 22, and each of the two footballs may be secured to the flange by bolts 20 having threads on the end portion 92. Bolts 20 may be tightened until the substantially planar exterior surface 86 of the flange comes into engagement with the corresponding surface of the football 18. The end portion 96 of the fitting 30 is provided with a substantially planar circular-shaped end surface 95 for engagement with O-ring 100, so that the O-ring achieves sealed engagement between the football 18 and the fitting 30 when the bolts 20 are tightened.

The flange 22 is thus rigidly secured to the fitting solely by first and second nipples 30. Fluid-tight connection is established between the passageway 38 in the football 18 and the passageways 12D, 12E in and the valve body by an O-ring seal 100 and the passageway 40 in the fitting 30. No portion of a flange thus need be machined for sealing engagement to prevent loss of fluid or fluid pressure. In prior art manifold bodies fabricated with a process end flange secured to the manifold body, the O-ring seal in the football will conventionally engage a portion of the flange to establish fluid-tight communication. According to the present invention, the end surface of the nipple 30 and the fitting 18 are sealed by O-ring 100.

The cost of manufacturing a valve body 12, a flange 22, and first and second nipples 30 is believed to be substantially lower than the cost of manufacturing a valve body with a suitable process-side flange affixed to the valve body. Moreover, the versatility of the manifold valve is substantially increased and the same valve body can be easily adapted for remote or direct mounting through the use or non-use of a flange 22 and first and second nipples 30. Finally, repair and maintenance of the valve manifolds should be decreased. According to the prior art of the type having a flange affixed to the valve body, if a portion of a flange adapted for engagement with the O-ring were nicked, the entire valve body was typically junked. According to the present invention, the flange 22 can be easily be replaced with a new flange. If the end surface of the nipple 30 adapted for engagement with the O-ring were nicked, only the fitting 30 need be replaced.

Figure 4:
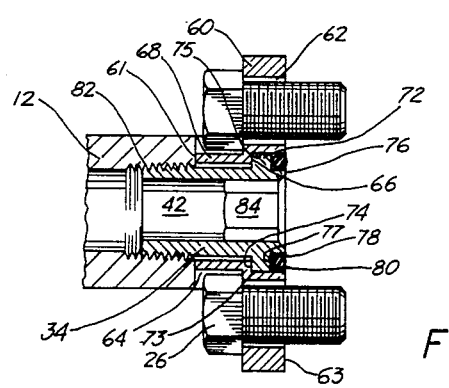
FIG. 4 is a side view, partially in cross-section, of a suitable flange and fitting for mounting on the instrument side of an instrument manifold.

Referring now to FIG. 4, the removable flange 24 and nipple 34 for the instrument side of the manifold will now be discussed. The instrument side flange 24 includes a first relatively thin rectangular-shaped portion 60 having dimensions similar to flange 22, and a second attached body portion 68 having a width of portion 60 and a height substantially corresponding to manifold body 12. Four direct mounting apertures 62 are provided in the portion 60 for receiving bolts 26, so that the flange may be rigidly secured to the transmitter 14. The apertures 62 are preferably provided at centerline spacings of approximately 1.625 inches, which is the standard spacing between apertures on the transmitter flange. The heads of the bolts 26 are provided on the manifold body side of the flange 24, and portion 68 of the flange may be provided with four curvilinear-shaped cutouts 64 allowing the bolt heads to rotate within the cutouts for threading the bolts to the transmitter. The instrument side of the flange is provided with first and second nipple receiving apertures for each of the nipples 34.

Each nipple 34 may thus be sealed with the body 12 by NPT threads as the substantially planar inner surface 61 of the flange comes into secured engagement with the body 12. Accordingly, the spacing between the substantially circular stop surface 74 and the threads of the nipple and the spacing between the substantially circular lip engaging portion 66 and the interior surface 61 of the flange are closely controlled. Close tolerance is also maintained between an outer diameter 33 of the nipple 34 and an inner diameter 25 of the nipple receiving aperture in the flange 24, so that the flange 24 is prevented from movement in any direction with respect to the body 12 when nipples 34 are in sealing engagement with the body. Passageway 42 in each nipple includes torque engaging surfaces 84.

Expanded end portion 72 of the nipple 34 opposite the threads includes recess 78 for receiving an O-ring member 80. On the instrument side, the O-ring typically is not provided on the transmitter flange. Accordingly, the substantially planar exterior surface 63 of the flange is adapted for sealing engagement with the flange of the transmitter (not depicted in FIG. 4) when the O-ring 80 has established sealing engagement between the circular end surface 77 of the nipple and an appropriate sealing surface of the transmitter flange. The tip 76 of the nipple 34 may be tapered for facilitating alignment of the flange 24 and nipple 34 with the flange and sealing surface of the transmitter. In other respects, the instrument-side flange and nipple are similar to the process-side flange and nipple.

Referring again to FIG. 1, it may be seen that the process side and instrument side nipples are aligned with the passageways through the valve to facilitate rod-out operations. The manifold body of the present invention may thus be easily cleaned and serviced. If any one of the flanges or special nipples becomes damaged, the component may be easily replaced and the manifold reused. Either end of the manifold body may be easily changed from a remote mounting to a direct mounting by adding or deleting the appropriate flange and a pair of special nipples.

The removable flange concept of the present invention is thus applicable to valve manifolds used in differential pressure systems, whether termed meter manifolds, valve manifolds, or instrument manifolds. The removable flange and special nipples of the present invention are thus applicable to any valve manifold having two passageways each having a threaded input port and a threaded output port, and having a crossover valve to facilitate control of fluid pressure from at least one of the input ports to a selected one of the output ports. The manifold of the present invention may be utilized with either hard-seat or soft-seat valve bodies. The seal between the rotatable valve stem and the valve bonnet may be made according to the teachings of U.S. patent application Ser. No. 563,961, filed Dec. 21, 1983, and hereby incorporated by reference.

The concepts of the present invention are not limited by the type of differential pressure sensing equipment or transmitter employed. A suitable transmitter 14 may be provided as shown in FIG. 1 for detecting differential pressure and outputting an electrical signal indicative of that differential pressure. Alternatively, any number of differential pressure gauges, meters, or recorders may be utilized, including commonly utilized chart-type meter manifold recorders.

Other alternative forms of the present invention will suggest themselves from a consideration of the apparatus and techniques herein discussed. Accordingly, it should be fully understood that the apparatus described herein and shown in the accompanying drawings are intended as exemplary embodiments of the invention, but not as limitations thereto.

What is claimed is:

1. A valve manifold of the type utilized for interconnecting a process component with a pressure detector, said valve manifold including a manifold body having first and second passageways interconnecting respective first and second inlet ports and first and second outlet ports, each of said inlet and outlet port at least partially defined by a tapered thread sidewall adapted for selectively receiving a remote coupling end connector, the improvement comprising:
 a flange for selective removable engagement with an end of said manifold body and having a plurality of direct mounting apertures for securing a direct coupling device to an outer face of said flange and further having first and second nipple receiving apertures;
 first and second nipples for independently structurally interconnecting an inner face of said flange to said manifold body;
 each of said nipples including
  (a) a central passageway for transmitting fluid pressure through said manifold and at least partially defined by torque engaging surfaces for facilitating rotation of said nippled relative to said manifold body,
  (b) a threaded end including a tapered thread for sealing engagement with said tapered thread sidewall of one of said ports,
  (c) a stop portion for forcing said inner face of said flange into rigid engagement with said end of said manifold and retaining said flange in rigid engagement with said manifold body, and
  (d) axial spacing between said stop portion and said tapered thread is selected so that said nipple forces said flange into rigid engagement with said manifold when said tapered thread is in sealing engagement with said tapered thread sidewall of one of said ports.

2. A valve manifold as defined in claim 1, wherein each of said nipples further comprises:
 a substantially planar circular-shaped end surface opposite said threaded end for sealing engagement with an O-ring seal.

3. A valve manifold as defined in claim 2, wherein:
 said flange is a process-side flange having an interior surface for engagement with an end of said manifold body adjacent said first and second inlet ports and an exterior surface for engagement with first and second elliptical-shaped flanges; and
 said circular-shaped end surface of each of said nipples is adapted for sealing engagement with an O-ring seal spaced between said end surface and one of said elliptical-shaped flanges.

4. A valve manifold as defined in claim 1, wherein each of said nipples has a substantially cylindrical configuration with a central axis.

5. A valve manifold as defined in claim 1, wherein said first and second nipple receiving apertures are located on said flange at centerline spacings of substantially 2.125 inches.

6. A valve manifold as defined in claim 1, wherein said threaded end of each of said nipples has ½ inch NPT threads.

7. A valve manifold as defined in claim 1, wherein said flange further comprises:
 said inner face for engagement with said manifold body is substantially planar;
 said outer face for engagement with said direct coupling device is substantially planar;
 a substantially planar circular-shaped lip member spaced between said inner face and said outer face for engagement with said stop portion for forcing said flange into rigid engagement with said manifold body; and
 each of said plurality of direct mounting apertures is spaced radially outwardly from said circular-shaped lip member.

8. A valve manifold as defined in claim 7, wherein said plurality of direct mounting apertures comprises two first direct mounting apertures and two second direct mounting apertures each on centerline spacings of substantailly 0.615 inches.

9. A valve manifold as defined in claim 1, wherein
 said flange is an instrument-side flange having an exterior surface in engagement with said pressure detector; and
 said first and second nipples are in sealing engagement with said first and second outlet ports, respectively.

10. A valve manifold as defined in claim 1, further comprising:
 a process-side flange for removable engagement with said manifold body and having third and fourth nipple receiving apertures; and
 third and fourth nipples for interconnecting said process-side flange to said manifold body, each nipple including a central passageway for transmitting fluid pressure, a threaded end for sealing engagement with one of said first or second inlet ports, and stop portion for forcing said process-flange into rigid engagement with said manifold body.

11. A flange subassembly for a valve manifold including a manifold body having a plurality of passageways interconnecting a plurality of inlet ports and a plurality of outlet ports each threaded for selectively receiving a tapered thread remote coupling end connector, said flange subassembly comprising:
 a flange for selective engagement with an end of said manifold body and having a plurality of direct mounting apertures and a plurality of nipple receiving apertures;
 a plurality of substantially cylindrical-shaped nipples for structurally interconnecting said flange to said manifold body;
 each of said nipples including a central passageway for transmitting fluid pressure, a threaded end including a tapered thread for sealing engagement with sidewalls adjacent one of said ports, a stop portion for forcing an interior surface of said flange into fixed engagement with said end of said manifold body, and
 axial spacing between said stop member and said tapered thread is selected so that said nipple forces said flange into engagement with said manifold body when said tapered thread is in sealing engagement with said threaded sidewall.

12. A flange subassembly as defined in claim 11, wherein a portion of said central passageway of each of said nipples includes a plurality of torque engaging surfaces for facilitating rotation of said nipple relative to said manifold body.

13. A flange subassembly as defined in claim 11, wherein each of said nipples further comprises:
  a substantially planar circular-shaped end surface opposite said threaded end for sealing engagement with an O-ring seal.

14. A flange subassembly as defined in claim 11, wherein said flange further comprises:
  a substantially planar interior surface for engagement with said manifold body;
  a substantially planar exterior surface;
  a substantially planar circular-shaped lip surface spaced between said interior surrface and said exterior surface for engagement with said stop portion for forcing said flange into fixed engagement with said manifold body; and
  each of said plurality of direct mounting apertures is spaced radially outwardly from said circular-shaped lip member.

15. A method for converting a flangeless valve manifold to a valve manifold having a flange in rigid engagement with an inlet face or an outlet face of said valve manifold and adapted for interconnection with an upstream or downstream component, said valve manifold including a manifold body having a plurality of passageways interconnecting a plurality of inlet ports and a plurality of outlet ports, each of said inlet ports and outlet ports threaded for selectively receiving a tapered thread of a remote coupling end connector, said method comprising:
  (a) forming a plurality of nipple-receiving apertures and a plurality of direct mounting apertures in said flange;
  (b) forming a plurality of nipples each having a central fluid passageways;
  (c) forming a tapered thread on an end of each of said plurality of nipples for sealing engagement with one of said ports;
  (d) forming a stop portion on each of said plurality of nipples at a selected spacing relative to said tapered thread so that said nipple will force said flange into engagement with said manifold body when said tapered thread is in sealing engagement with said manifold;
  (e) structurally interconnecting said flange to said inlet face or said outlet face of said manifold by threading each of said plurality of nipples to said manifold until said stop portion forces an inner face of said flange into rigid engagement with said manifold; and
  (f) structurally interconnecting said component to said flange with securing means adapted for cooperation with said direct mounting apertures.

16. The method as defined in claim 15, wherein said component is structurally interconnected to said flange by bringing said component into rigid engagement with an outer face of said flange.

17. The method as defined in claim 15, wherein the step of threading each of said nipples to said manifold includes:
  inserting a tool into said central fluid passageway of said nipple; and
  rotating said tool and thereby rotating said nipple relative to said manifold.

18. The method as defined in claim 15, wherein each of said tapered threads formed on each of said nipples is adapted for sealing engagement with one-half inch NPT threads.

19. The method as defined in claim 15, further comprising:
  forming a substantially planar interior surface on said flange for engagement with said manifold body;
  forming a substantially planar exterior surface on said flange for engagement with said component; and
  forming a substantially planar circular-shaped lip member on said flange spaced between said interior surface and said exterior surface for engagement with said stop portion of one of said nipples.

20. The method as defined in claim 15, further comprising:
  forming a substantially planar circular-shaped end surface on each of said nipples opposite said threaded end for sealing engagement with an O-ring seal.

* * * * *

UNITED STATES PATENT AND TRADEMARK OFFICE
CERTIFICATE OF CORRECTION

PATENT NO. : 4,582,089
DATED     : April 15, 1986
INVENTOR(S) : Spencer M. Nimberger It is certified that error appears in the above-identified patent and that said Letters Patent is hereby corrected as shown below:

In Column 7, line 5, delete "eccentric".

In Column 7, line 6 delete "for" and insert therefor
--or--.

In Column 10, line 24, delete "0.615" and insert therefor
--1.625--.

Signed and Sealed this

Eighth Day of August, 1989

Attest:

DONALD J. QUIGG

*Attesting Officer*         Commissioner of Patents and Trademarks